US005516497A

United States Patent [19]

Speronello et al.

[11] Patent Number: 5,516,497
[45] Date of Patent: May 14, 1996

[54] STAGED METAL-PROMOTED ZEOLITE CATALYSTS AND METHOD FOR CATALYTIC REDUCTION OF NITROGEN OXIDES USING THE SAME

[75] Inventors: Barry K. Speronello, Belle Mead; John W. Byrne, Edison; James M. Chen, Edison, all of N.J.

[73] Assignee: Engelhard Corporation, Iselin, N.J.

[21] Appl. No.: 678,777

[22] Filed: Apr. 1, 1991

Related U.S. Application Data

[62] Division of Ser. No. 340,992, Apr. 20, 1989, Pat. No. 5,024,981.

[51] Int. Cl.⁶ .......................... B01D 53/56; B01D 53/58
[52] U.S. Cl. .................. 423/235; 423/237; 423/239.2
[58] Field of Search ...................... 423/213.2, 213.5, 423/213.7, 235, 237, 239, 246, 239.2; 502/43

[56] References Cited

U.S. PATENT DOCUMENTS

| | | | |
|---|---|---|---|
| 3,970,739 | 7/1976 | Shiraishi et al. | 423/235 S |
| 4,297,328 | 10/1981 | Ritscher et al. | 423/213.2 |
| 4,961,917 | 10/1990 | Byrne | 423/239 |
| 5,041,270 | 8/1991 | Fujitani et al. | 423/213.2 |

FOREIGN PATENT DOCUMENTS

| | | | |
|---|---|---|---|
| 2133271 | 1/1973 | Germany | 423/213.2 |
| 2208190 | 8/1973 | Germany | 423/213.7 |
| 51-69476 | 6/1976 | Japan . | |
| 62-97629 | 5/1987 | Japan | 423/237 |
| 2-4453 | 1/1990 | Japan | 423/237 |

Primary Examiner—Gary P. Straub
Assistant Examiner—Timothy C. Vanoy

[57] ABSTRACT

A zeolite catalyst composition is provided in which a first or upstream zone of the catalyst has a lower metal (e.g., iron or copper) promoter loading than the metal promoter moter loading of the second or downstream zone of the catalyst. The first zone may contain from none up to about 1 percent by weight of the promoter and the second zone may contain from about 1 to 30 percent by weight promoter. The zeolite may be any suitable zeolite, especially one having a silica-to-alumina ratio of about 10 or more, and a kinetic pore size of about 7 to about 8 Angstroms with such pores being interconnected in all three crystallographic dimensions. The method of the invention provides for passing a gaseous stream containing oxygen, nitrogen oxides and ammonia sequentially through first and second catalysts as described above, the first catalyst favoring reduction of nitrogen oxides and the second catalyst favoring the oxidation or other decomposition of excess ammonia.

12 Claims, 3 Drawing Sheets

STAGED METAL-PROMOTED ZEOLITE CATALYSTS AND METHOD FOR CATALYTIC REDUCTION OF NITROGEN OXIDES USING THE SAME

This is a divisional of application Ser. No. 07/340,992 filed on Apr. 20, 1989, now U.S. Pat. No. 5,024,981.

BACKGROUND OF THE INVENTION

1. The present invention is concerned with metal-promoted zeolite catalysts and a method for the catalytic reduction of nitrogen oxides with ammonia using the catalysts, including carrying out such catalytic reduction selectively in the presence of oxygen. 2. The Related Art Both synthetic and natural zeolites and their use in promoting certain reactions, including the selective reduction of nitrogen oxides with ammonia in the presence of oxygen, are well known in the art. Zeolites are aluminosilicate crystalline materials having rather uniform pore sizes which, depending upon the type of zeolite and the type and amount of cations included in the zeolite lattice, range from about 3 to 10 Angstroms in diameter.

Japanese Patent Publication (Kokai) No. 51-69476, published Jun. 16, 1976 on Application No. 49-142463, filed Dec. 13, 1974, discloses a method for reducing nitrogen oxides in waste gases by reaction with ammonia in the presence of a metal-promoted, dealuminized synthetic or natural mordenite zeolite. The resistance of the catalyst to sulfurous poisons, particularly sulfur trioxide and sulfuric acid mist, is said to be enhanced by dealuminizing the mordenite to increase the silica to alumina ratio to more than 12, preferably to more than 15. The zeolite is promoted with 0.5 to 30 weight percent of at least one of a number of metals including copper, vanadium, chromium, iron, cobalt or nickel, and is used at a reaction temperature of 200° to 500° C. with from 0.5 to three times the stoichiometric amount of ammonia reductant. Example 1 of the Publication illustrates an iron-promoted mordenite ore as being effective for the reduction of nitrogen oxides. In connection with Example 2 of the Publication, it is stated that a slight decrease of the activity of a dealuminized, i.e., high silica to alumina ratio, copper-promoted mordenite catalyst is recognized when sulfur trioxide is included in the gas stream. However, an "extreme improvement" of resistance to sulfur trioxide poisoning is noted in comparison with a copper mordenite which has not been dealuminized to increase its silica to alumina ratio.

UK Patent Application 2,193,655A discloses a catalyst containing a low surface area titania and a copper-promoted zeolite for use in the reduction of nitrogen oxides with ammonia. The zeolite has an average pore diameter of 10 Angstroms or less, preferably 8 Angstroms or less, and a silica to alumina molar ratio of 10 or more, preferably 20 or more; the resultant titania/promoted zeolite catalysts having these characteristics are stated to be resistant to volatile catalyst poisons such as arsenic, selenium, tellurium, etc., contained in exhaust gases. Examples of suitable zeolites are mordenite, ZSM-5 and ferrierite.

U.S. Pat. No. 4,297,328 discloses a "three way conversion" catalytic process for the simultaneous catalytic oxidation of carbon monoxide and hydrocarbons and reduction of nitrogen oxides for purifying the exhaust gas of automobile engines operated within a prescribed range of air to fuel ratio (column 4, lines 63–68). The disclosed catalyst is stated to be a copper-promoted zeolite having a silica to alumina ratio greater than 10, preferably greater than 20 (column 6, lines 23–28). Representative high-silica zeolites are described at columns 6–8 of the patent and include (column 6, lines 29–33) silicalite (as described in U.S. Pat. No. 4,061,724), ZSM-5, ZSM-8, ZSM-11, ZSM-12, hyper Y, ultrastabilized Y, Beta, mordenite and erionite. Ultrastabilized Y is described (column 7, lines 22–25) as "a form of zeolite Y which has been treated to give it the organophilic characteristic of the adsorbents of the present invention." Example 6 of the patent is stated to show no measureable loss in combustion activity of the copper-promoted zeolite catalyst due to sulfer poisoning (exposure of the catalyst to methylmercaptan in the gaseous stream). The patent thus discloses the utility of the copper-promoted specified zeolites for three-way conversion in an exhaust gas generated by a lean air to fuel ratio combustion mixture.

U.S. Pat. No. 4,302,431 discloses method and apparatus for controlling the content of nitrogen oxides in gases, including a first stage of high temperature, uncatalyzed reduction of nitrogen oxides with ammonia, followed by a second, catalyzed stage in which decomposition of residual nitrogen oxides and ammonia (column 4, lines 44–49) is carried out. Example 1 discloses the use of calcium silicate plates impregnated with ferric sulfate as the catalyst, and the patentee notes (column 6, lines 36–42) that other catalysts having denitrifying capacity, such as chromium and vanadium, may also be utilized.

U.S. Pat. No. 3,970,739 discloses (column 3, lines 32–46) mixing gases obtained from an ammonia synthesis plant waste water stream with flue gases so as to provide about 0.3 to 10 moles of ammonia per mole of nitrogen oxides. The resultant gaseous mixture is contacted in a first stage with a metal catalyst to reduce nitrogen oxides and any unreacted ammonia is then decomposed in a second stage in the presence of a suitable catalyst; the process is carried out at a temperature of from 150° to 700° C. The first stage catalyst may be platinum or palladium, or oxides of copper, vanadium, molybdenum or tungsten, or a metal complex oxide such as an iron-chromium complex oxide (column 5, line 53 et seq). The second stage catalyst may be any suitable catalyst (column 7, lines 1–7) such as iron-chromium, chromium-mangnesia, and chromium plus one or more of tin, antimony vanadium, cobalt phosphorus zinc, nickel, titanium, molydbenum and tungsten (column 6, line 59). Separate catalytic reactors or a single reactor containing the first and second stage catalysts in sequence, may be used.

The art thus shows an awareness of the utility of metal-promoted zeolite catalysts including, among others, iron-promoted and copper-promoted zeolite catalysts, for the selective catalytic reduction of nitrogen oxides with ammonia. The art also shows an awareness of providing a two-stage process in which, in a first stage, a thermal or catalyzed process may be used for the reduction of nitrogen oxides with ammonia and, in a second stage, residual ammonia is decomposed to nitrogen.

SUMMARY OF THE INVENTION

Generally, the present invention provides a metal-promoted zeolite catalyst and a method for using the same in the selective catalytic reduction of nitrogen oxides with ammonia, in which the promoter loading on the catalyst is staged so that the promoter loading in a first or upstream zone of the catalyst is lower than the promoter loading in a second or downstream zone of the catalyst. It has been found that by thus staging the promoter loading on a suitable zeolite catalyst, the first zone catalyst favors the selective catalytic reduction of nitrogen oxides with ammonia whereas the second catalyst zone favors the oxidation of (excess or residual) ammonia to nitrogen.

More specifically, in accordance with the present invention there is provided a method for reacting nitrogen oxides with ammonia in a gaseous stream, the method comprising the following steps. A gaseous stream containing nitrogen oxides and ammonia is passed through a first catalyst zone containing a first zeolite catalyst which is optionally promoted with not more than about 1% by weight of an iron and/or copper promoter, calculated as the metal and based on the weight of metal plus the first zeolite. The gaseous stream is contacted within the first zone with the first catalyst under conditions effective to reduce nitrogen oxides with ammonia and leave residual ammonia in the gaseous stream. The nitrogen oxides-depleted gaseous stream containing residual ammonia obtained as above is then passed through a second catalyst zone containing a second zeolite catalyst which is promoted with more than about 1% by weight of an iron and/or copper promoter, calculated as the metal and based on the weight of metal plus the second zeolite. The nitrogen oxides-depleted gaseous stream is contacted within the second zone with the second catalyst in the presence of oxygen and under conditions effective to oxidize ammonia to nitrogen, and the resultant ammonia-depleted gaseous stream is then withdrawn.

In accordance with another aspect of the invention, the first zeolite catalyst may contain, for example, from about 0.1 to about 1% by weight of the promoter, e.g., iron; the second zeolite catalyst may contain from more than about 1% to 30% by weight of the promoter, e.g., iron, preferably from about 2% to 5% by weight promoter, both calculated as the metal and based on the weight of promoter (as metal) plus the respective zeolite.

Other aspects of the invention include introducing ammonia into the gaseous stream, for example, in an amount to provide from about 0.7 to 2 moles of ammonia per mole of nitrogen oxides. In another aspect of the invention, the reaction is carried out at a temperature of from about 200° C. to 600° C., e.g., from about 300° C. to 550° C.

Still other aspects of the invention include utilizing catalysts as described below in the methods described above.

Compositional aspects of the present invention provide a catalyst composition effective for reducing nitrogen oxides with ammonia in a gaseous stream. The composition has a first catalyst and a second catalyst, as sensed relative to the sequence of flow of the gaseous stream through the composition, and comprises the following components. A first catalyst comprises a first zeolite which is optionally promoted with not more than about 1% by weight of an iron and/or copper promoter dispersed therein, calculated as the metal and based on the weight of metal plus the first zeolite. A second catalyst comprises a second zeolite promoted with more than about 1% by weight of an iron and/or copper promoter dispersed therein, calculated as the metal and based on the weight of metal plus second zeolite.

In another aspect of the invention, the first zeolite catalyst comprises an iron and/or copper-promoted zeolite catalyst, preferably an iron-promoted zeolite catalyst.

In yet another aspect of the invention, at least one, and preferably both, of the first zeolite catalyst and the second zeolite catalyst have a silica to alumina ratio of 0 or higher and an average pore kinetic diameter of from about 7 to about 8 Angstroms. The zeolite pore structure may be interconnected in all three crystallographic dimensions by pores having a kinetic diameter of about 7 to about 8 Angstroms.

As used herein and in the claims, reference to a "first" catalyst or catalyst zone and a "second" catalyst or catalyst zone is made with reference to the sequence of introduction therein of a gaseous stream to be treated. Thus, the "first" catalyst is the upstream catalyst and the "second" catalyst is the downstream catalyst, with "upstream" and "downstream" being as sensed in the direction of flow of the treated gaseous steam therethrough.

References herein and in the claims to a zeolite catalyst containing a percent "by weight" promoter means a percentage calculated as the weight of promoter, as the metal, divided by the combined weights of promoter (as the metal) plus the zeolite.

Reference herein and in the claims to "metal", "iron" and "copper" with respect to the promoters should not be taken to imply that the promoter is necessarily in the elemental or zero valence state; the terms enclosed in quotes should be understood to include the presence of promoters as they exist in the catalyst compositions, e.g., as exchanged ions and/or impregnated ionic or other species.

DETAILED DESCRIPTION OF THE INVENTION AND PREFERRED EMBODIMENTS THEREOF

Figure 1:
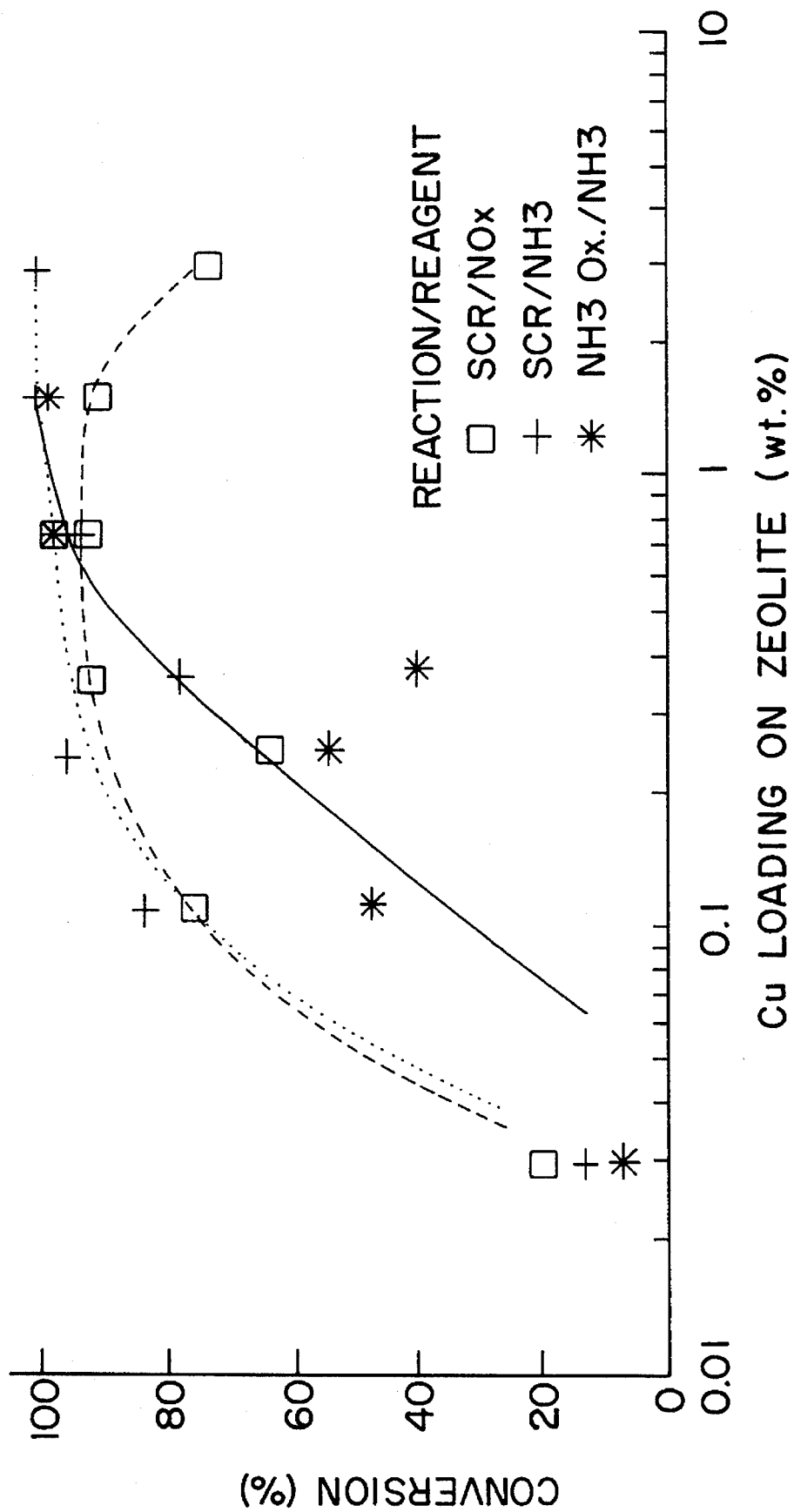
FIG. 1 of the drawings is a plot showing the percent conversion of nitrogen oxides and ammonia in a treated gaseous stream, versus the copper loading of a zeolite catalyst.

In order to reduce the emissions of nitrogen oxides from flue and exhaust gases, such as the exhaust generated by gas turbine engines, ammonia is added to the gaseous stream containing the nitrogen oxides and the gaseous stream is then contacted with a suitable catalyst at elevated temperatures in order to catalyze the reduction of nitrogen oxdes with ammonia. Such gaseous streams, for example, the products of combustion of an internal combustion engine or of a gas-fueled or oil-fueled turbine engine, often inherently also contain substantial amounts of oxygen. A typical exhaust gas of a turbine engine contains from about 2 to 15 volume percent oxygen and from about 20 to 500 volume parts per million nitrogen oxides, the latter normally comprising a mixture of NO and $NO_2$. Usually, there is sufficient oxygen present in the gaseous stream to oxidize residual ammonia, even when an excess over the stoichiometric amount of ammonia required to reduce all the nitrogen oxides present is employed. However, in cases where a very large excess over the stoichiometric amount of ammonia is utilized, or wherein the gaseous stream to be treated is lacking or low in oxygen content, an oxygen-containing gas, usually air, may be introduced between the first catalyst zone and the second catalyst zone, in order to insure that adequate oxygen is present in the second catalyst zone for the oxidation of residual or excess ammonia. Metal-promoted zeolites can be used to promote the reaction of ammonia with nitrogen oxides ("$NO_x$") to form nitrogen and $H_2O$ selectively over the competing reaction of oxygen and ammonia. The catalyzed reaction of ammonia and nitrogen oxides is therefore sometimes referred to as the selective catalytic reduction ("SCR") of nitrogen oxides or, as sometimes herein, simply as the "SCR process".

Theoretically, it would be desirable in the SCR process to provide ammonia in excess of the stoichiometric amount required to react completely with the nitrogen oxides present, both to favor driving the reaction to completion and to help overcome inadequate mixing of the ammonia in the gaseous stream. However, in practice, significant excess ammonia over such stoichiometric amount is normally not provided because the discharge of unreacted ammonia from the catalyst to the atmosphere would itself engender an air pollution problem. Such discharge of unreacted ammonia can occur even in cases where ammonia is present only in a stoichiometric or sub-stoichiometric amount, as a result of incomplete reaction and/or poor mixing of the ammonia in the gaseous stream, resulting in the formation therein of channels of high ammonia concentration. Such channeling is of particular concern when utilizing catalysts comprising monolithic honeycomb-type carriers comprising refractory bodies having a plurality of fine, parallel gas flow paths extending therethrough because, unlike the case of beds of particulate catalyst, there is no opportunity for gas mixing between channels.

The present invention is predicated on the surprising discovery that the selectivity of a zeolite catalyst can be tailored to favor either (1) the SCR process, i.e., the reduction of nitrogen oxides with ammonia to form nitrogen and $H_2O$, or (2) the oxidation of ammonia with oxygen to form nitrogen and $H_2O$, the selectivity being tailored by controlling the promoting metal content of the zeolite. More specifically, it has been found that at metal loading levels, e.g., iron or copper, on zeolites which do not exceed about 1 percent by weight metal, calculated as the metal and based on the combined weight of metal plus the zeolite, selectivity for the SCR reaction, even in the presence of oxygen, is significantly favored over the oxidation of ammonia by oxygen. It has also been discovered that at metal loadings on the zeolite above about 1 percent by weight metal, same basis as above, selectivity of the catalyst is shifted towards the oxidation of ammonia by oxygen at the expense of the SCR process, thereby improving ammonia removal.

The above principles are utilized by providing a staged or two-zone catalyst in which a first catalyst zone with no or a low metal promoter (iron or copper) loading on a zeolite, that is, from 0 to not more than about 1 percent by weight metal, is followed by a second catalyst zone comprising a zeolite having thereon a metal loading in excess of about 1 percent by weight. The resultant catalyst composition thus has a first (upstream) zone which favors the reduction of nitrogen oxides with ammonia, and a second (downstream) zone which favors the oxidation of ammonia. In this way, when ammonia is present in excess of the stoichiometric amount, whether throughout the flow cross section of the gaseous stream being treated or in localized channels of high ammonia concentration, the oxidation of residual ammonia by oxygen is favored by the downstream or second catalyst zone. The quantity of ammonia in the gaseous stream discharged from the catalyst is thereby reduced or eliminated.

Generally, any suitable zeolite material may be utilized in the catalyst compositions of the invention. Many zeolites demonstrate good thermal stability and so stand up well to high temperatures, thereby enabling the treatment of relatively high temperature gaseous streams without precooling. For example, turbine engine exhausts typically have a temperature in the range of about 450° to 600° C. This temperature range is too high for selective catalytic reduction catalysts such as those based on the anatase form of titania because, at such elevated temperatures, the -anatase converts to a less catalytically active rutile form. It thus becomes necessary, when using such temperature-sensitive catalysts, to invest in heat exchange equipment to cool the gaseous stream before treating it catalytically to reduce the nitrogen oxides. However, by utilizing suitable zeolite catalysts in accordance with the teachings of the present invention, high temperature gaseous streams, for example, gaseous streams at temperatures up to about 600° C., may be treated without seriously adversely affecting the life or efficiency of the catalyst. Suitable promoted zeolite materials demonstrate sufficient thermal and hydrothermal stability to survive turbine exhaust conditions and provide an acceptably long life and efficiency of the catalysts. The zeolite materials employed should have a silica to alumina molecular ratio of greater than 10 in order to enhance their resistance to acidic conditions, as discussed in more detail below. Preferably, the zeolite materials are medium to large pore zeolites having pore openings of at least about 4 Angstroms in diameter. Such openings are large enough to admit the reactants and products and to catalyze or otherwise facilitate the desired reactions.

The gaseous streams containing nitrogen oxides may also contain sulfur oxides, especially sulfur dioxide. For example, the exhaust of a turbine engine which is operating on a liquid fuel, such as a number 2 fuel oil, may contain from about 10 to 150 parts per million of sulfur dioxide. The tolerance of the catalyst material for such sulfurous contaminants is increased, i.e., the catalyst is rendered more resistant to sulfur poisoning, by selecting a zeolite of a larger average pore size than that which is necessary to admit the reactants and products. Specifically, an average pore size of about 7 Angstroms or more, e.g., about 7 to about 8 Angstroms is preferred for enhanced resistance to sulfur poisoning. The most preferred types of zeolite for resistance to sulfur poisoning are those which have a pore system in which the 7 to 8 Angstrom diameter pores are interconnected in all three crystallographic dimensions. Such zeolite materials are described in detail in co-pending and commonly owned patent application Ser. No. 341,405, filed Apr. 20, 1989, now U.S. Pat. No. 4,961,917, of John W. Byrne, entitled "Zeolite Catalysts and Method For Reduction of Nitrogen Oxides With Ammonia Using the Same", the disclosure of which is hereby incorporated herein and made part hereof. As disclosed in the aforesaid co-pending patent application, a particularly suitable class of such sulfur-resistant zeolite materials is comprised of Beta zeolites, ultrastable Y ("USY") zeolites and ZSM-20 zeolites. Generally, silica to alumina ratios well in excess of the minimum of 10 may be employed. Conversion efficiencies of 90 to 93% for $NO_x$ reduction with ammonia have been attained with fresh copper promoted zeolite having silica to alumina ratios of 20, 26, 28, 37 and 62. A conversion efficiency of 77% was attained by a fresh copper promoted ZSM-5 zeolite having a silica to alumina ratio of 50. However, fresh copper promoted USY zeolites with silica to alumina ratios of, respectively, 8 and 30 provided 85% and 39% conversions of $NO_x$, suggesting that at least for USY, silica to alumina ratios should be significantly less than 30.

The catalysts of the present invention comprise one or more suitable zeolite materials arranged in at least a first and second zone in which the first zone is either not promoted with a metal or has a promoter loading not in excess of 1 percent by weight metal, and the second zone has a greater promoter loading than the first zone, the second zone containing more than about 1 percent by weight metal. Any suitable physical form of the catalyst may be utilized, such as a monolithic honeycomb-type body containing a plurality of fine, parallel gas flow passages extending therethrough, the walls of which are coated with the zeolite catalytic material. Typically, such monolithic bodies are made of a refractory ceramic material such as cordierite, mullite or alumina, and the catalytic material coating the fine gas flow passages is contacted by the gaseous stream as it flows through the gas flow passages. The first or inlet section or zone of such a monolith body will be prepared with a lower copper loading than the second or downstream zone of the same monolith body. This can be readily accomplished by dipping one end if the monolith into a slurry of a low- or no-copper containing zeolite, and the other end of the monolith into a slurry of a more heavily copper-loaded zeolite. Alternatively, separate monolith bodies may be used for the first and second zones.

The catalyst may also take the form of a packed bed of pellets, tablets, extrudates or other particles or shaped pieces, such as plates, saddles, tubes or the like. The physical configuration of the catalyst used in a given case will depend on a number of factors such as the space available for the catalytic reactor, the activity of the catalyst material utilized, and the permitted or desired amount of pressure drop across the catalyst bed. When catalysts are used to treat engine exhausts, such as the exhaust gas of a turbine engine, it is usually desired to minimize pressure drop in order to enhance the efficiency of the engine. In such cases, the preferred physical configuration of the catalyst is one which provides parallel flow passageways for the gas, such as those found in the above-described honey-comb-type catalysts. Other arrangements providing such parallel flow passageways include the use of parallel plates or stacked tubes. Because of its ease of handling and installation as well as good mass transfer characteristics relative to other parallel passage configurations, a highly preferred physical configuration of the catalysts of the invention is a monolithic honeycomb member having a relatively high cell (flow passageway) density of approximately 60 cells or more per square inch of end face of the honeycomb member. The walls defining the gas flow passages (or cells) are desirably as thin as possible consistent with the requisite mechanical strength of the honeycomb. Thus, the catalysts of the invention may take the form of a monolithic honeycomb carrier, the gas flow passages of which comprise or are coated with a zeolitic catalyst material with staged copper loadings as described above. For example, a catalytically inert honeycomb carrier member, such as a cordierite carrier, may be coated with a washcoat of fine particles of copper-promoted zeolite. Alternatively, a powder of copper-promoted zeolite may be mixed with a binder and extruded into the honeycomb configuration. In another approach, the catalytic material may be formed in situ by preparing the honeycomb structure from a zeolitic precursor raw material which is then treated to form the zeolitic material as part of the honeycomb structure, followed by copper impregnation. In this regard, see U.S. Pat. No. 4,157,375, assigned to the assignee of this application, the disclosure of which is hereby incorporated herein.

Reference is made below to the weights of solids being on a "vf basis". The term in quotes means a volatiles-free basis, and is used to indicate the weight that the solid in question would have if it were calcined at 1000° C. to drive off volatiles. Thus, if 10.1 grams of a substance contains 0.1 gram of such volatiles, the 10.1 grams is reported as "10 grams (vf basis)". Unless specifically otherwise stated, all weight percents herein and in the claims are stated on a vf basis.

The following examples demonstrate the efficacy of certain embodiments of the present invention.

Example 1

In order to demonstrate the effect of the promoter loading on zeolite catalyst selectivity as between (i) selective catalytic reduction of nitrogen oxides with ammonia and (ii) ammonia oxidation with oxygen, a series of catalysts were prepared as follows.

I. A catalyst consisting of a honeycomb ceramic support coated with a washcoat of synthetic mordenite zeolite containing 0.12% by weight Cu (expressed as the metal), was prepared as follows:

1. 100 g (vf basis) of Linde LZM-8 mordenite zeolite powder was added to 200 g of an aqueous $Cu(SO_4)$ solution containing 0.6 g of Cu.
2. This slurry was heated to 82° C. with stirring to suspend the solids, and maintained at 82° C. for about 30 minutes.
3. It was then vacuum filtered to separate the solids from the liquid.
4. The solid was washed with an equal volume of water, and then dried at 100° C.
5. Chemical analysis showed the solid to contain 0.12% by weight Cu.
6. 48.5 g (vf) of the dried powder was added to 81 g of deionized water and milled for 1 hour at about 50 rpm in a 500 ml polyethylene jar filled ½ full of alumina cylinders (ca. 0.5 in. dia×0.5 in. long).
7. 3.5 ml of glacial acetic acid was then added to the mill, and milling was continued for another 15 hours.
8. The milled slurry was coated on to a cordierite monolithic support comprising a one inch (2.5 cm) diameter by three inches (7.6 cm) long cylindrical core drilled from a cell/in² cordierite support purchased from Applied Ceramics Co. The coating was carried out by immersing the weighed support into the slurry, gently agitating the support to remove entrapped air from the channels, removing the saturated support from the slurry, and removing excess slurry from the channels by blowing with compressed air.
9. After drying at 110° C. and calcining for 1 hour at 450° C., the coated support was weighed, and the washcoat loading was calculated to be about 1.6 g/in³. The resultant catalyst is designated Catalyst I.

II. A catalyst consisting of a honeycomb ceramic support coated with a washcoat of pentasil zeolite having the ZSM-5 crystal structure, a silica to alumina molar ratio of 46/1 (by chemical analysis), and containing 0.27% by weight Cu (expressed as the metal) was prepared as follows:

1. 168 g (vf basis) of the pentasil zeolite powder was first calcined for 2 hours at 316° C. followed by 2 hours at 593° C. then added to 504 g of an aqueous $Cu(SO_4)$ solution containing 15.1 g of Cu.

2. This slurry was heated to 82° C. with stirring to suspend the solids then maintained at 82° C. for 1 hour.
3. It was then vacuum filtered to separate the solids from the liquid, then washed with an equal volume of 95° C. deionized water and dried at 100° C.
4. Steps 2 and 3 were repeated twice more for a total of three copper exchanges.
5. Chemical analysis showed the solid to contain 0.27% by weight Cu.
6. 50 g (vf) of the dried powder was added to 79 g of deionized water and milled for 16 hours at about 50 rpm in a 500 ml polyethylene jar filled ½ full of alumina cylinders (ca. 0.5 in. dia×0.5 in. long).
7. The milled slurry was coated on to a cordierite monolithic support comprising a one inch (2.5 cm) diameter by three inches (7.6 cm) long cylindrical core drilled from a 200 cell/in$^2$ cordierite support purchased from Applied Ceramics Co. The coating was carried out by immersing the weighed support into the slurry, gently agitating the support to remove entrapped air from the channels, removing the saturated support from the slurry, and removing excess slurry from the channels by blowing with compressed air.
8. After drying at 110C. and calcining for 1 hour at 450° C., the coated support was weighed, and the washcoat loading was calculated to be about 1.7 g/in$^3$ The resultant catalyst is designated Catalyst II.

III. A catalyst consisting of a honeycomb ceramic support coated with a washcoat of synthetic mordenite zeolite containing 0.42% by weight Cu (expressed as the metal) was prepared as follows:

1. 100 g (vf basis) of Linde LZM-8 mordenite zeolite powder was added to 240 ml. of an aqueous $Cu(SO_4)$ solution containing 1.5 g of Cu.
2. This slurry was heated to 82° C. with stirring to suspend the solids, and maintained at 82° C. for about 1 hour.
3. It was then vacuum filtered to separate the solids from the liquid.
4. The solid was washed with an equal volume of water, and then dried at 100° C.
5. Chemical analysis showed the solid to contain 0.42% by weight Cu.
6. 50 g (vf) of the dried powder was added to 81 g of aleionized water and milled for 16 hours at about 50 rpm in a 500 ml polyethylene jar filled ½ full of alumina cylinders (ca. 0.5 in. dia×0.5 in. long).
7. The slurry was coated on to a cordierite monolithic support comprising a one inch (2.5 cm) diameter by three inches (7.6 cm) long cylindrical core drilled from a 200 cell/in$^2$ cordierite support purchased from Applied Ceramics Co. The coating was carried out by immersing a weighed support into the slurry, gently agitating the support to remove entrapped air from the channels, removing the saturated support from the slurry, and removing excess slurry from the channels by blowing with compressed air.
8. After drying at 110° C. and calcining for 1 hour at 450° C., the coated support was weighed, and the washcoat loading was calculated to be about 1.5 g/in$^3$. The resultant catalyst is designated Catalyst III.

IV. A catalyst consisting of a honeycomb ceramic support and a washcoat of synthetic mordenite zeolite containing 1.68% by weight Cu (expressed as the metal) was prepared as follows:

1. 150 g (vf basis) of Toyo Soda TSZ-650XOA mordenite zeolite powder was added to 357 ml of an aqueous $Cu(SO_4)$ solution containing 3.6 g of Cu.
2. This slurry was heated to 82° C. with stirring to suspend the solids, and maintained at 82° C. for about 1 hour.
3. It was then vacuum filtered to separate the solids from the liquid.
4. The solid was washed with an equal volume of water, and then dried at 100° C.
5. Chemical analysis showed the solid to contain 1.68% by weight Cu.
6. 50 g (vf) of the dried powder was added to 91 g of deionized water and milled for 16 hours at about 50 rpm in a 500 ml polyethylene jar filled 1/2 full of alumina cylinders (ca, 0.5 in. dia×0.5 in. long).
7. The slurry was coated on to cordierite monolithic support comprising a one inch (2.5 cm) diameter by three inches (7.6 cm) long cylindrical core drilled from a 200 cell/in$^2$ cordierite support purchased from Applied Ceramics Co. The coating was carried out by immersing the weighed support into the slurry, gently agitating the support to remove entrapped air from the channels, removing the saturated support from the slurry, and removing excess slurry from the channels by blowing with compressed air.
8. After drying at 110° C. and calcining for 1 hour at 450° C. the coated support was weighed, and the washcoat loading was calculated to be about 2.0 g/in$^3$. The resultant catalyst is designated Catalyst IV.

V. A catalyst consisting of a honeycomb ceramic support coated with a washcoat of pentasil zeolite having the ZSM-5 crystal structure, silica to alumina molar ratio of 208/1 (by chemical analysis), and containing 0.03% by weight Cu (expressed as the metal), was prepared as follows:

1. 250 g (vf basis) of the pentasil zeolite powder was first calcined for 2 hours at 316° C. followed by 2 hours at 593° C. then added to 750 g of an aqueous $Cu(SO_4)$ solution containing 22.5 g of Cu.
2. This slurry was heated to 82° C. with stirring to suspend the solids then maintained at 82° C. for 1 hour.
3. It was then vacuum filtered to separate the solids from the liquid then washed with an equal volume of deionized water and dried at 100° C.
4. Steps 2 and 3 were repeated twice more for a total of 3 Cu exchanges.
5. Chemical analysis showed the solid to contain 0.03% by weight Cu.
6. 50 g (vf) of the dried powder was added to 80 g of deionized water and milled for 16 hours at about 50 rpm in a 500 ml polyethylene jar filled ½ full of alumina cylinders (ca. 0.5 in. dia×0.5 in. long).
7. The milled slurry was coated on to a cordierite monolithic support comprising a one inch (2.5 cm) diameter by three inches (7.6 cm) long cylindrical core drilled from a 200 cell/in$^2$ cordierite support purchased from Applied Ceramics Co. The coating was carried out by immersing a weighed support into the slurry, gently agitating the support to remove entrapped air from the channels, removing the saturated support from the slurry, and removing excess slurry from the channels by blowing with compressed air.
8. After drying at 110° C. and calcining for 1 hour at 450° C., the coated support was weighed, and the washcoat loading was calculated to be about 1.8 g/in$^3$ The resultant catalyst is designated Catalyst V.

VI. A catalyst consisting of a honeycomb ceramic support and a washcoat of synthetic mordenite zeolite containing 0.83% by weight Cu (expressed as the metal) was prepared as follows:

1. 4.72 kg (vf basis) of Linde LZM-8 mordenite zeolite powder was added to 9.45 kg of an aqueous $Cu(SO_4)$ solution containing 378 g of Cu.
2. This slurry was heated to 82° C. with stirring to suspend the solids, maintained at 82° C. for 3 hours then vacuum filtered to separate the solids from the liquid.
3. A second batch of 4.72 kg (vf basis) of Linde LZM-8 mordenite zeolite powder was Cu exchanged per steps 1 and 2.
4. The filter cakes from both batches were combined then added to 28.3 kg of deionized water with stirring then vacuum filtered to separate the solids from the liquid and finally washed with an equal volume of deionized water then dried at 100° C.
5. Chemical analysis showed the solid to contain 0.83% by weight Cu.
6. About 50 g (vf) of the dried powder was added to about 80 g of deionized water and milled for 1 hour at about 50 rpm in a 500 ml polyethylene jar filled ½ full of alumina cylinders (ca. 0.5 in. dia×0.5 in. long).
7. 3.5 ml of glacial acetic acid was then added to the mill, and milling was continued for another 15 hours. The resultant slurry contained 38.4% by weight solids.
8. The milled slurry was coated on to a cordierite monolithic support comprising a 1.5 inch (3.8 cm) diameter by three inches (7.6 cm) long cylindrical core drilled from a 300 cell/in$^2$ Corning Celcor® support. The coating was carried out by immersing the weighed support into the slurry, gently agitating the support to remove entrapped air from the channels, removing the saturated support from the slurry, and removing excess slurry from the channels by blowing with compressed air.
9. After drying at 110° C. and calcining for 1 hour at 450° C., the coated support was weighed, and the washcoat loading was calculated to be about 1.5 g/in$^3$ The resultant catalyst is designated Catalyst VI.

VII. A catalyst consisting of a honeycomb ceramic support and a washcoat of Beta zeolite containing 3.23% by weight Cu (expressed as the metal) was prepared as follows:

1. The following materials were combined in a 2 liter Teflon® lined, autoclave reactor and stirred sufficiently to maintain the solids in suspension:
   a. 174.68 g of Hi-Sil® #233 silica powder.
   b. Sufficient amounts of each of the following to result in molar ratios of $SiO_2$, $Na_2O$, $H_2O$ and (tetraethylammonium)$_2$O to $Al_2O_3$ of 23.1, 1.09, 380 and 4.86, respectively:
      i) Nalco #680 sodium aluminate (43.7% $Al_2O_3$, 29.1% $Na_2O$, 25.9% $H_2O$)
      ii) 40% aqueous solution of tetraethyl-ammonium hydroxide
      iii) Deionized water
2. The reactor was sealed and heated to 150° C. with continued stirring.
3. After 3 days at 350° C. the reactor was cooled to room temperature and the contained slurry was vacuum filtered to separate the solids from the liquid then washed with an equal volume of deionized water.
4. The resultant washed filter cake was dried at 100° C. then calcined for 1 hour at 316° C. followed by 1 hour at 593° C. The calcined powder had a molar $SiO_2$/$Al_2O_3$ ratio of 19/1 (by chemical analysis). Analysis by x-ray diffraction of the resultant material showed the characteristic peaks associated with zeolite Beta.
5. 137 g (vf basis) of calcined zeolite Beta powder was added to an aqueous solution containing 823 g of 54% by weight ammonium nitrate solution and 823 g deionized water.
6. The pH was adjusted to 3.5 using $NH_4OH$.
7. This slurry was heated to 80° C. with stirring to suspend the solids, and maintained at 80° C. for about 1 hour. During this time the pH was maintained at about 3.4
8. The slurry was then vacuum filtered to separate the solids from the liquid, and the solids were allowed to dry overnight on the filter.
9. The dried solids were then added to 411 g of an aqueous $Cu(SO_4)$ solution containing 12.3 of Cu.
10. This slurry was heated to 82° C. with stirring to suspend the solids and maintained at 80° C. for about 1 hour.
11. It was then vacuum filtered to separate the solids from the liquid.
12. The solid was washed on the filter, dried at 100° C, and calcined for 1 hour at 538° C.
13. Chemical analysis showed the solid to contain 3.23% by weight Cu.
14. About 50 g (vf) of the dried powder was added to about 80 g of deionized water and milled for 1 hour at about 50 rpm in a 500 ml polyethylene jar filled ½ full of alumina cylinders (ca. 0.5 in. dia×0.5 in. long).
15. 3.5 ml of glacial acetic acid was then added to the mill, and milling was continued for another 15 hours.
16. The milled slurry was coated on to a cordierite monolithic support comprising a one inch (2.5 cm) diameter by three inches (7.6 cm) long cylindrical core drilled from a 200 cell/in$^2$ cordierite support purchased from Applied Ceramics Co. The coating was carried out by immersing the weighed support into the slurry, gently agitating the support to remove entrapped air from the channels, removing the saturated support from the slurry, and removing excess slurry from the channels by blowing with compressed air.
19. After drying at 110° C. and calcining for 1 hour at 450° C., the coated support was weighed, and the washcoat loading was calculated to be about 1.7 g/in$^3$ The resultant catalyst is designated Catalyst VII.

VIII. Catalytic performance was tested at 550° C. and 80,000 hr$^{-1}$ VHSV as follows:

1. The test unit comprised a cylindrical reactor into which a single honeycomb catalyst was mounted using ceramic fiber insulation to seal the annular gap between the outer skin of the catalyst and the reactor wall.
2. The test gas was a mixture of air, $N_2$, NO in $N_2$, $NH_3$ in $N_2$, and water. For evaluating $NO_x$ SCR activity, the mixture comprised about 10% $O_2$, 10% water, 400 ppm NO, sufficient $NH_3$ to provide the desired ratio of $NH_3/NO_x$, and the balance $N_2$. For evaluating $NH_3$ oxidation activity, a similar gas mixture was used, except that it contained about 400 ppm $NH_3$ and substantially no NO.
3. Most heat was provided to the reactor by preheating the test gas mixture, but the reactor was also heated using electrical resistance heaters to insure good temperature control around 550° C. Specifically, the air, NO in $N_2$, and N₂ were mixed and passed through a heat transfer coil of stainless steel tubing in an electrically heated furnace at about 600° C. The desired amounts of $NH_3$ in $N_2$ and water were added to the gas stream after it had left the preheating furnace, and before it entered the test reactor.

4. The $NO_x$ and $NH_3$ contents of the inlet gas mixture was measured periodically using a Model 10 $NO_x$ analyzer supplied by the Thermo Electron Corporation. Draeger tubes were used to verify the $NH_3$ concentration.

5. The $NO_x$ and $NH_3$ contents of the mixture exiting the reactor was also measured using the same Model 10 $NO_x$ analyzer Draeger tubes were also used to verify the outlet $NH_3$ concentration.

6. $NO_x$ and NHB conversions were calculated from the inlet and outlet $NO_x$ calculations as follows:

% $NO_x$ conversion=$(1-(NO_{out}/NO_{in}))\times 100$

% $NH_3$ conversion=$(1-(NH3_{out}/NH3_{in}))\times 100$

The results of the above described testing of sample Catalysts I–VII are plotted in FIG. 1 of the drawings. In FIG. 1, the asterisks represent the percentage of ammonia present which is oxidized under conditions wherein the nitrogen oxides content was zero. The squares and crosses of the Figure represent, respectively, the conversion of nitric oxide (NO) and ammonia under selective catalytic reaction conditions, i.e., when the gaseous stream contains nitrogen oxide, ammonia and oxygen, and the molar ratio of $NH_3/NO$ is one. The Figure shows that increasing copper levels increase the activity of the zeolite catalyst for ammonia conversion by oxidation with oxygen, and that the conversion of nitrogen oxides by selective catalytic reduction with ammonia experienced a peak at about a 0.8 percent by weight copper, and thereafter declined. Acceptable $NO_x$ conversion was attained at a copper loadings from about 0.2 to 1 percent copper but above about 1 percent copper, the selective catalytic reduction of $NO_x$ decreased because the reaction zone was depleted in ammonia due to its oxidation by oxygen. The plot of the Figure clearly shows that copper loadings of less than about 1 percent by weight copper, and preferably from about 0.2 to 1 percent copper, are preferred in situations where conversion of nitrogen oxides by reaction with ammonia is to be favored, and that copper loadings in excess of about 1 percent by weight are preferred in situations where reaction of ammonia with oxygen is to be favored.

EXAMPLE 2

Catalysts IV and VII were subjected to additional tests as described in Section VIII above, with the flow rate of $NH_3$ in $N_2$ being varied to achieve the below indicated $NH_3/NO$ Ratios.

TABLE

| Catalyst | $NH_3/NO_x$ Ratio | % $NO_x$ Conversion | % Ammonia Conversion |
| --- | --- | --- | --- |
| VII | 1.0 | 72 | 100 |
| VII | 1.3 | 77 | 100 |
| VII | 1.8 | 83 | 99 |
| IV | 1.0 | 90 | 100 |
| IV | 1.7 | 94 | 98 |

The results shown in the above Table demonstrate that the use of a relatively high copper loading on the zeolite provides adequate conversion of nitrogen oxides by reaction with ammonia, and very little discharge of residual ammonia even at a molar ratio of ammonia to nitrogen oxides of 1.8. At lower copper loadings, it is seen that the activity for $NO_x$ conversion is increased but, at copper loadings well above 1 percent, the catalyst is still extremely effective in controlling the discharge of unreacted residual ammonia even at an ammonia to nitrogen oxides molar ratio of 1.7. The beneficial effects on the oxidation of excess or unreacted ammonia by increasing the promoter loading is made clear by the results attained.

EXAMPLE 3

A series of catalysts was prepared by a technique similar to that described in Part VII of Example 1. Batches of the resulting Beta powder were promoted with either iron or copper or exchanged with NH4 to provide $NH_4^+$ and metal +promoted zeoites as follows:

| Catalyst Designation | % by Weight | Promoter |
| --- | --- | --- |
| Cu Beta 1 | 3.42 | Cu |
| Cu Beta 2 | 2.56 | Cu |
| Fe Beta 1 | 2.78 | Fe |
| Fe Beta 2 | 4.42 | Fe |
| $NH_4^+$ Beta | — | None |

EXAMPLE 4

I. Small portions of each powder (Fe Beta 1, Fe Beta 2, Cu Beta 1 and Cu Beta 2) were separately granulated into a −40+80 mesh screen fraction for testing. This was done as follows:

A. Several disks were made at nominally 10,000–15,000 lb/in² pressure from each powder, using a tool steel die in a hydraulic press.

B. Each disk was gently ground with a porcelain mortar and pestle, and the resultant granules screened through 40 and 80 mesh screens.

C. The size fraction that passed through 40 mesh and was retained upon the 80 mesh screen was used for testing.

II. Samples of $NH_4^+$ Beta powder, Fe Beta 1, Fe Beta 2, Cu Beta 1 and Cu Beta 2 powders were aged for 840 hours at 520° C. using the following procedure.

A. Several grams of each −40+80 mesh powder were placed in separate compartments of glazed porcelain refractory boats (nominally 1.5 cm wide×1.5 cm deep× 10 cm long, with each compartment being 2 cm long).

B. The boats were placed in the hot zone of a 5 cm diameter horizontal tube furnace, and the furnace was sealed.

C. A gas containing 10% $O_2$, 20% $H_2O$, and the balance $N_2$, was passed through the furnace tube at a rate of 22 liters per minute ("l/min") and the furnace was heated to a hot zone temperature of 520° C. As used herein "l/min" means liters per minute based on standard conditions of temperature and pressure.

D. After the furnace had reached temperature, sufficient water was injected into the entrance of the hot zone to provide a 10% steam environment.

E. After 840 hours the furnace was cooled and the samples removed. The refractory boat containing the $NH_4^+$ Beta sample and the Fe Beta 2 sample (4.42% Fe) failed during aging, and those samples were lost.

The prepared samples were tested for catalytic activity, as described in the following Example 5.

Example 5

I. The aged samples obtained from Example 4 were tested as catalysts for selective catalytic reduction of $NO_x$ activity ("SCR Testing") and for $NH_3$ oxidation activity, using nominally 3 millimeter inside diameter "U" shaped Vycor reactors having two vertical legs nominally 20 cm long, and a semicircular bottom section nominally 5 cm in diameter. The procedure used was as follows:

A. A plug of fused silica wool was placed at the base of the vertical section of the inlet leg of one of the reactors.

B. One tenth of a gram (0.1 g) of the −40+80 mesh Beta powder to be tested was placed on the silica wool to serve as the catalyst bed, and a Vycor thermocouple well was positioned just above the catalyst bed.

C. Between 1 and 3 reactors were placed in a reactor furnace and connected to the gas supply-system.

D. $N_2$ and air were mixed into a gas containing 10% $O_2$ and the balance $N_2$, and this was passed through a furnace where it was preheated to 350° C.

E. The heated gas stream of Step D was then divided among the reactors such that each reactor received a flow rate of 2 l/min. (for a space velocity of $1.2\times10^6$ $ccg^{-1}hr^{-1}$).

F. The reactor furnace was then heated to a temperature nominally 50° C. above the test temperature, such that the reactor thermocouples read the nominal test temperature.

G. The reaction gases were than added to the inlet gas stream in the following amounts:
  1. For SCR testing, 200 parts per million parts by volume "Vppm" each of NO and $NH_3$ were added to the gas.
  2. For $NH_3$ oxidation activity testing, 200 Vppm of $NH_3$ was added to the gas.

H. After all the flows and temperatures had stabilized, the inlet and outlet concentrations of $NO_x$ and $NH_3$ were measured using a Thermoelectron Model 10 $NO_x$ analyzer for both $NO_x$ and $NH_3$ analysis. Periodic $NH_3$ measurements were verified using the Draeger tube method.

I. The gas temperature was then changed, and the measurements repeated as in Step H above.

The results obtained by the tests of Example 5 are plotted in FIGS. 2–5.

Figure 2:
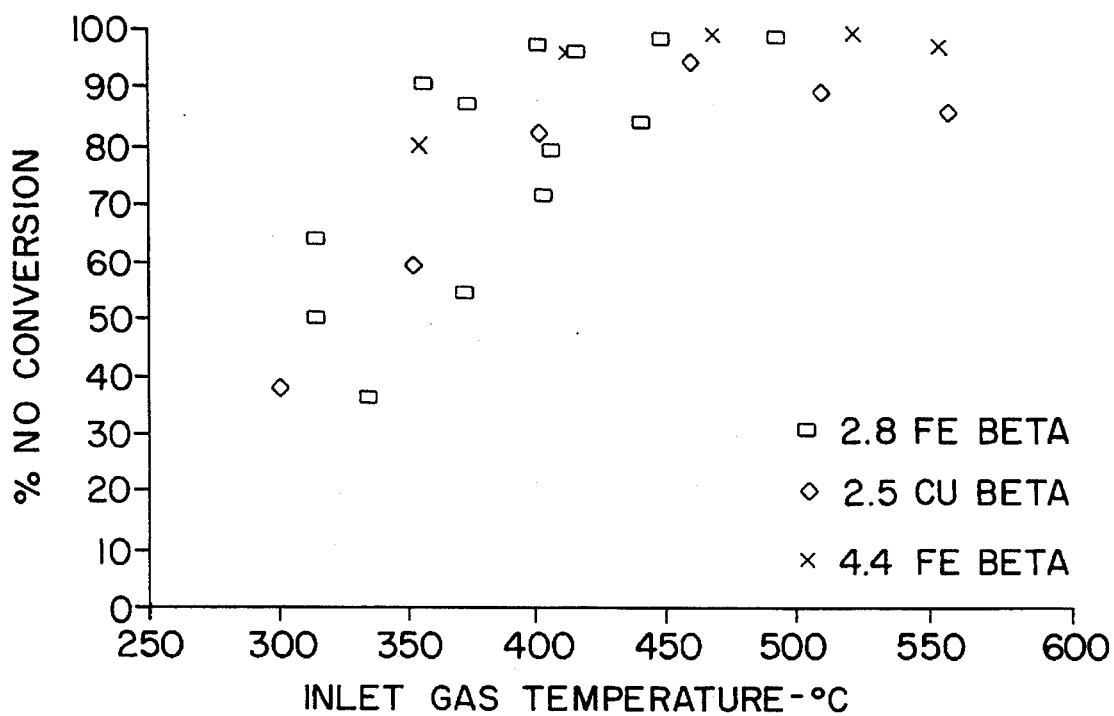
FIG. 2 is a plot showing the percent conversion of NO versus inlet temperature for various metal-promoted zeolite catalysts.
Figure 3:
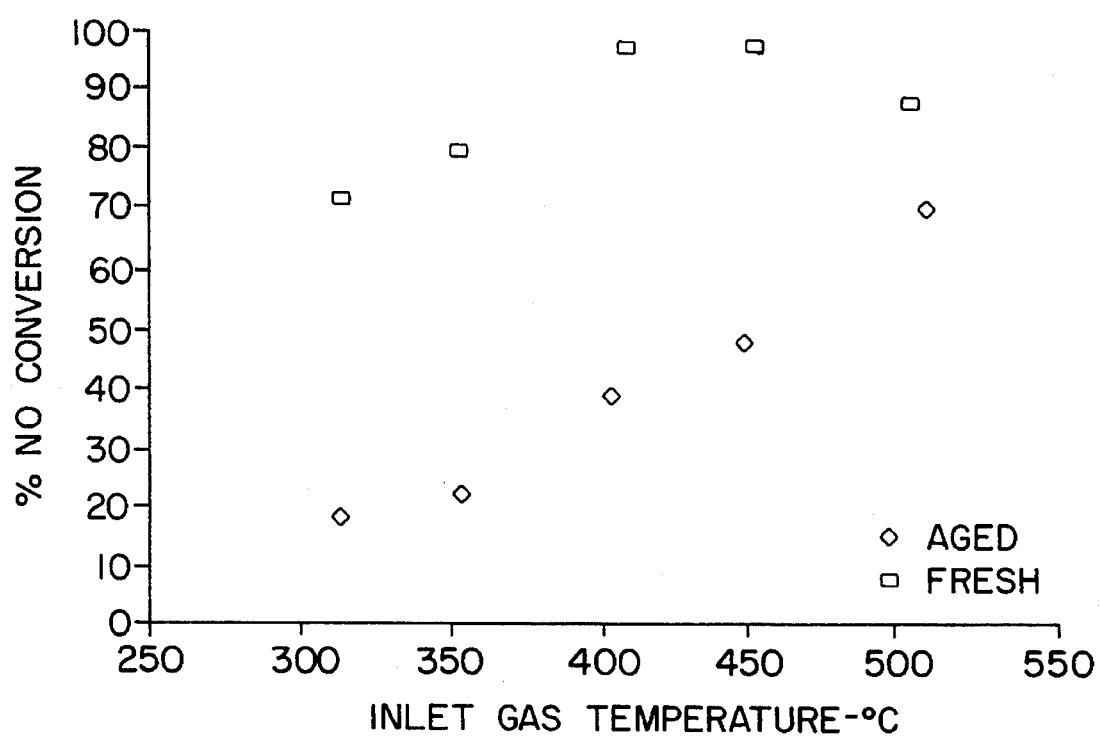
FIG. 3 is a plot showing the percent conversion of NO versus the inlet temperature of a gaseous stream to be treated for aged and fresh copper-promoted zeolite catalysts.
Figure 4:
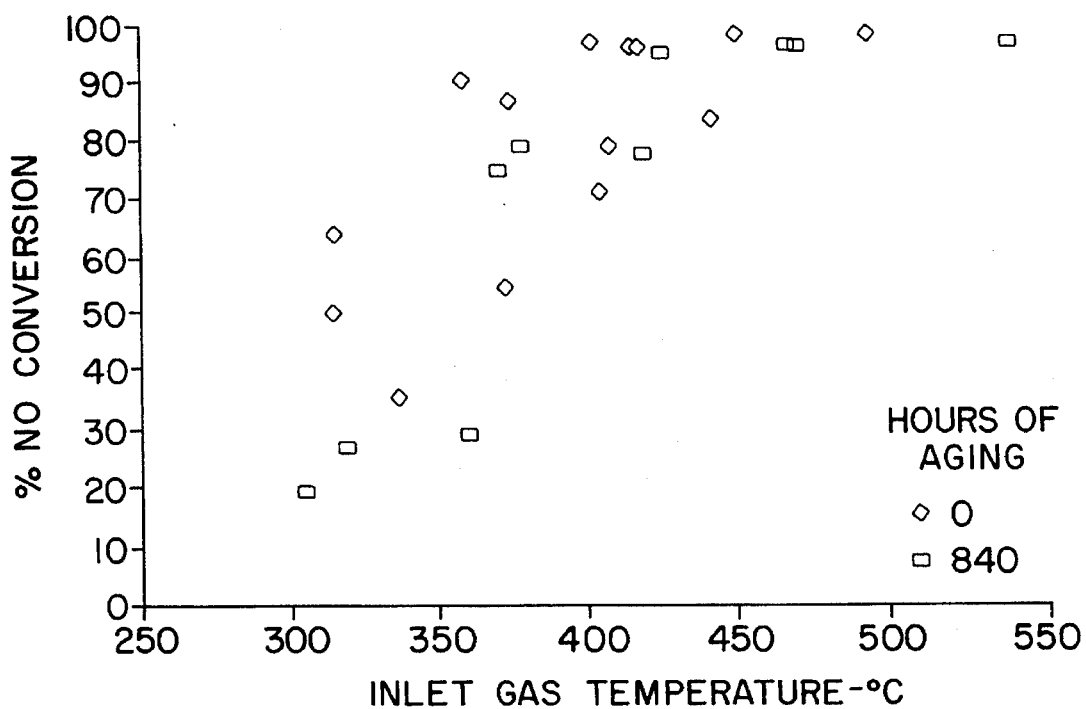
FIG. 4 is a plot showing the percent conversion of NO versus inlet temperature of a gas stream passed through aged and fresh iron promoted beta zeolite catalysts.

In each of FIGS. 2, 3 and 4 the percentage conversion of nitric oxide (NO) in the test gas is plotted on the vertical axis, and the test gas inlet temperature (to the catalyst bed) is plotted on the horizontal axis. The nitric oxide (NO) content of the test gas is representative of nitrogen oxides ($NO_x$) generally, and so reference below is made to $NO_x$ conversion.

FIG. 2 compares the $NO_x$ SCR process conversion in the test gas flowed through beds comprised of fresh samples of Cu Beta⁻2, Fe Beta⁻¹ and Fe Beta 2. In FIG. 2, data points for Cu Beta 2 are shown by diamonds, for Fe Beta 1 by rectangles and for Fe Beta 2 by Xs. The data of FIG. 2 show that the copper and iron promoted Beta powders have similar SCR activities and selectivities although, as evidenced by the slight conversion decrease with Cu Beta 2 above about 450° C. the iron promoted catalysts, Fe Beta 1 and Fe Beta 2, may have less of a tendency than copper promoted Beta to oxidize $NH_3$ in the presence of $NO_x$.

FIG. 3 compares the $NO_x$ SCR process conversion in the test gas flowed through beds comprised of fresh and aged samples of Cu Beta⁻¹. In FIG. 3, data points for aged Cu Beta 1 are shown by diamonds and for fresh Cu Beta 1 by reactangles. The data of FIG. 3 show that Cu Beta⁻¹ experienced substantial deactivation during aging.

FIG. 4 compares the $NO_x$ SCR process conversion in the test gas flowed through beds comprised of fresh and aged samples of Fe Beta⁻¹. In FIG. 4, data points for fresh Fe Beta 1 are shown by diamonds, and data points for aged (840 hours) Fe Beta 1 are shown by reactangles. The data of FIG. 4 show that Fe Beta⁻¹ did not deactivate after 840 hours of aging.

Figure 5:
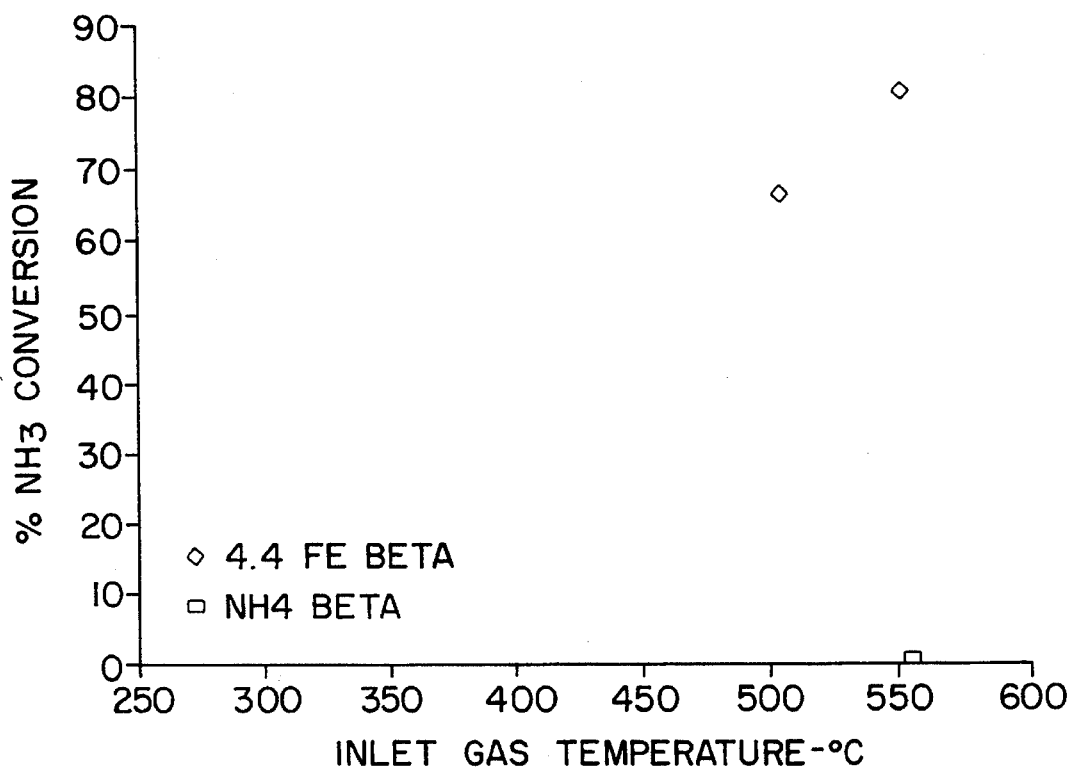
FIG. 5 is a plot showing the percent conversion of ammonia versus inlet temperature of a gas stream fed to different beta zeolite catalysts.

In FIG. 5, the percentage conversion of $NH_3$ in the test gas is plotted on the vertical axis, and the test gas inlet temperature (to the catalyst bed) is plotted on the horizontal axis. FIG. 5 compares the $NH_3$ conversion in the test gas flowed through beds comprised of fresh samples of Fe Beta⁻² and $NH_4^+$ Beta. In FIG. 5, data points for Fe Beta 2 are shown by diamonds and data points for $NH_4+$ Beta are shown by rectangles. The data of FIG. 5 show excellent conversion of $NH_3$ by Fe Beta 2 and no conversion by $NH_4^+$ Beta. Analysis showed that the $NH_3$ oxidation was selective to $N_2$ and $H_2O$, and there was no evidence of $NO_x$ formation with either tested catalyst. The Fe Beta_2 showed substantial $NH_3$ oxidation activity in the absence of $NO_x$, producing about 80+% conversion even at the exceptionally high space velocity of $1.2\times10^6$ $ccg^{-1}hr^{-1}$. $NH_4^+$ Beta pro- 06 produced no detectable $NH_3$ conversion under these conditions.

The results above show that iron promoted Beta is a highly active and selective bifunctional catalyst that is particularly well suited for the SCR process and excess or residual ammonia oxidation at temperature above about 400° C. It is extremely active and selective for the SCR process reaction when $NH_3$ and $NO_x$ are both present. However, under conditions where there is excess $NH_3$ present, the iron promoted catalyst is extremely active for the selective oxidation of $NH_3$ by oxygen to $N_2$ and water. In addition, iron promoted Beta does not deactivate during exposure to hydrothermal conditions similar to those expected in a high temperature SCR process environment, such as the exhaust of a gas turbine. Copper promoted Beta, while exhibiting catalytic performance similar to that of iron promoted Beta in the fresh state, deactivated noticeably during aging.

Generally, it will be appreciated that the catalysts of the present invention provide a simple and relatively inexpensive means for efficiently catalyzing the reduction of nitrogen oxides with ammonia and preventing the discharge of any residual ammonia which emerges from the first catalyst zone. The utilization of low pressure drop monolithic honeycomb catalysts is facilitated in the practice of the invention because the ability of the catalyst to consume excess or residual ammonia overcomes the inherent channeling effect of honeycomb catalysts which otherwise would tend to exacerbate high ammonia concentrations present in the gaseous stream. The present invention permits the use, as both the first and second catalysts, of catalyst compositions which are identical except for different promoter loadings thereon, thereby simplifying manufacturing procedures and costs.

While the invention has been described in detail with respect to specific preferred embodiments thereof, it will be appreciated by those skilled in the art that, upon a reading and understanding of the foregoing, numerous variations may be made to the disclosed embodiments which variations are nonetheless believed to lie within the spirit and scope of the invention and of the appended claims.

What is claimed is:

1. A method for reacting nitrogen oxides with ammonia in a gaseous stream comprises:

(a) passing a gaseous stream containing nitrogen oxides and ammonia through a first catalyst zone containing a first zeolite catalyst comprising up to about 1% by weight of a promoter selected from the group consisting of one or both of iron and copper, calculated as the metal and based on the weight of metal plus the first zeolite, and therein contacting the gaseous stream with the first catalyst under conditions effective to reduce nitrogen oxides with ammonia and leave residual ammonia in the gaseous stream;

(b) passing the nitrogen oxides-depleted gaseous stream containing residual ammonia obtained in step (a) through a second catalyst zone containing a second zeolite catalyst which is promoted with more than about 1% by weight of a promoter selected from the group consisting of one or both of iron and copper, calculated as the metal and based on the weight of metal plus the second zeolite, and therein contacting the nitrogen oxides-depleted gaseous stream with the second catalyst in the presence of oxygen and under conditions effective to oxidize ammonia to nitrogen, and withdrawing the resultant ammonia-depleted gaseous stream.

2. The method of claim 1 wherein the first zeolite catalyst includes the promoter.

3. The method of claim 2 wherein (a) the first zeolite catalyst contains from about 0.1 to about 1 percent by weight of the promoter, and (b) the second zeolite catalyst contains from more than about 1 to about 30 percent by weight of the promoter, the percents by weight of both (a) and (b) being calculated as the metal and based on the weight of metal plus the respective zeolite.

4. The method of claim 3 wherein the second zeolite catalyst contains from about 1 to about 5 percent by weight of the promoter.

5. A method for reducing nitrogen oxides in an oxygen-containing gaseous stream comprises:

(a) introducing ammonia into the gaseous stream;

(b) passing the ammonia-containing gaseous stream resulting from step (a) through a first catalyst zone containing a first zeolite catalyst comprising up to about 1% by weight of a promoter selected from the group consisting of one or both of iron and copper, calculated as the metal and based on the weight of metal plus first zeolite, and therein contacting the gaseous stream with the first catalyst at a temperature of from about 200° C. to 600° C. under conditions effective to reduce nitrogen oxides with ammonia and leave residual ammonia in the gaseous stream;

(c) passing the gaseous stream obtained from step (b), which is depleted in nitrogen oxides and contains oxygen and residual ammonia, to a second catalyst zone containing a second zeolite catalyst which is promoted with more than about 1% by weight of a promoter selected from the group consisting of iron and copper, calculated as the metal and based on the weight of metal plus zeolite, and therein contacting the resultant gaseous stream with the second catalyst at a temperature of from about 200° C. to 600° C. under conditions effective to oxidize ammonia to nitrogen.

6. The method of claim 5 wherein the first zeolite catalyst includes the promoter.

7. The method of claim 1 wherein the first zeolite catalyst contains from about 0.2 to 1% by weight of promoter, calculated as the metal and based on the weight of metal plus first zeolite.

8. The method of any one of claims 1, 2, 3, 4, 5, 6 or 7 wherein the promoter comprises iron.

9. The method of any one of claims 1, 2, 3, 4, 5, 6 or 7 wherein at least one of the first zeolite catalyst and the second zeolite catalyst has a silica to alumina ratio of 10 or higher and an average pore kinetic diameter of from about 7 to 10 Angstroms.

10. The method of claim 9 wherein at least one of the first zeolite catalyst and the second zeolite catalyst has a pore structure which is interconnected in all three crystallographic dimensions by pores having an average kinetic pore diameter of from about 7 to about 8 Angstroms.

11. The method of any one of claims 1, 2, 3, 4, 5, 6 or 7 wherein at least one of the first zeolite and the second zeolite is selected from the group consisting of USY, Beta and ZSM-20.

12. The method of any one of claims 2, 3, 4, 5, 6 or 7 wherein the first zeolite catalyst includes iron as the promoter and the second zeolite catalyst includes copper as the promoter.

* * * * *